United States Patent
Koets

(10) Patent No.: US 8,995,001 B1
(45) Date of Patent: Mar. 31, 2015

(54) USER-SPECIFIED INSTRUCTIONS FOR HOT FOLDER DOCUMENTS

(71) Applicant: Gary Alan Koets, Longmont, CO (US)

(72) Inventor: Gary Alan Koets, Longmont, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/288,709

(22) Filed: May 28, 2014

(51) Int. Cl.
*G06F 3/12* (2006.01)

(52) U.S. Cl.
CPC ............ *G06F 3/1275* (2013.01); *G06F 3/1204* (2013.01); *G06F 3/1288* (2013.01)
USPC ......................................... 358/1.15; 358/1.13

(58) Field of Classification Search
None
See application file for complete search history.

(56) References Cited

U.S. PATENT DOCUMENTS

| | | | |
|---|---|---|---|
| 2006/0026121 A1* | 2/2006 | Terao | 707/1 |
| 2011/0035619 A1 | 2/2011 | Watariuchi | |
| 2012/0133981 A1 | 5/2012 | Kise | |
| 2012/0162708 A1 | 6/2012 | Hagiwara et al. | |
| 2012/0182580 A1 | 7/2012 | Yamashita et al. | |
| 2012/0224222 A1 | 9/2012 | Kinoshita et al. | |
| 2012/0327437 A1 | 12/2012 | Hanawa | |
| 2013/0070292 A1 | 3/2013 | Ohkawa | |

FOREIGN PATENT DOCUMENTS

| | | | |
|---|---|---|---|
| JP | 2009104303 A | | 5/2009 |
| JP | 2013186678 | * | 9/2013 |

OTHER PUBLICATIONS

Machine translation in english of JP Pub 2013-186678 to Morooka Hidekazu.*

* cited by examiner

*Primary Examiner* — Eric A Rust
*Assistant Examiner* — Haris Sabah
(74) *Attorney, Agent, or Firm* — Duft Bornsen & Fettig LLP

(57) ABSTRACT

User-specified instructions for documents processed from a hot folder. A print server monitors hot folders for retrieval of files to be processed in a print system based on settings of the hot folders. The print server is detects a management file in a hot folder that indicates a number of documents to print over a period of time, retrieves documents from the hot folder for printing based on instructions in the management file, and initiates scheduling of the retrieved documents with a printer of the print system. The print server also determines a total of documents printed after expiration of the period of time, determines whether the total of documents printed corresponds with the number indicated in the management file, and sends a notification to a user of the hot folder when the total does not correspond with the number indicated in the management file.

18 Claims, 4 Drawing Sheets

USER-SPECIFIED INSTRUCTIONS FOR HOT FOLDER DOCUMENTS

FIELD OF THE INVENTION

The invention relates to print systems, and in particular, to hot folder instructions for a print system.

BACKGROUND

A hot folder is a directory that moves a file automatically into a specific task. Hot folders are frequently used to help automate workflow processes in printing environments. For example, a user may copy a Portable Document Format (PDF) file into a hot folder for automatic processing and routing to a printer. The repetitive task of choosing a specific printer and specifying print-related attributes each time a batch of documents are to be printed is substantially reduced or eliminated. Print shop environments therefore frequently implement hot folder functionality for added convenience to clients that print many documents on high-volume printers.

In order to automate print-related tasks, a user copies a printable file into a hot folder and an operator configures workflow software to detect the presence of the printable file in a hot folder at regular intervals. Upon detection, the workflow software "sweeps" the file by removing it from the hot folder and processes the file in accordance with predefined attributes of the hot folder. Due to the automatic nature of the hot folder system, the user of the hot folder is afforded little control over the configuration of processing options and typically has no knowledge as to the status of the documents after they are swept from the hot folder unless the operator manually checks the processing logs and informs the user.

SUMMARY

Embodiments described herein provide for user-specified instructions for documents in a hot folder. More specifically, the workflow software that monitors hot folders, sweeps files, and processes the files in a print system is made more flexible by allowing a user to define certain tasks with a management file that is copied into the user's hot folder. The workflow software integrates the user instructions in the management file and may override, at least temporarily, the default/installed settings of the hot folder as defined in the workflow software. Therefore, the management file enables the user to implement instructions for documents that are to be carried out by the workflow software on a project-by-project basis. Continual modification to the settings of individual hot folders or the workflow software by a print operator of a print system is largely eliminated. Additionally, documents and processing events deemed important to a user may be specified in the management file such that a user is updated of a processing status of certain documents swept from the hot folder.

One embodiment is an apparatus that includes a print server. The print server is configured to monitor hot folders for retrieval of files to be processed in a print system based on settings of the hot folders. The print server is further configured to detect a management file in a hot folder that indicates a number of documents to print over a period of time, to retrieve documents from the hot folder for printing based on instructions in the management file, and to initiate scheduling of the retrieved documents with a printer of the print system. The print server is also configured to determine a total of documents printed after expiration of the period of time, to determine whether the total of documents printed corresponds with the number of documents to print indicated in the management file, and to send a notification to a user of the hot folder when the total of documents printed does not correspond with the number of documents to print indicated in the management file.

Another embodiment is a method. The method includes monitoring hot folders for retrieval of files to be processed in a print system based on settings of the hot folders. The method further includes detecting a management file in a hot folder that indicates a number of documents to print over a period of time, retrieving documents from the hot folder for processing based on instructions in the management file, and initiating scheduling of the retrieved documents with a printer of the print system. The method also includes determining a total of documents printed after expiration of the period of time, determining whether the total of documents printed corresponds with the number of documents to print indicated in the management file, and sending a notification to a user of the hot folder when the total of documents printed does not correspond with the number of documents to print indicated in the management file.

The above summary provides a basic understanding of some aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
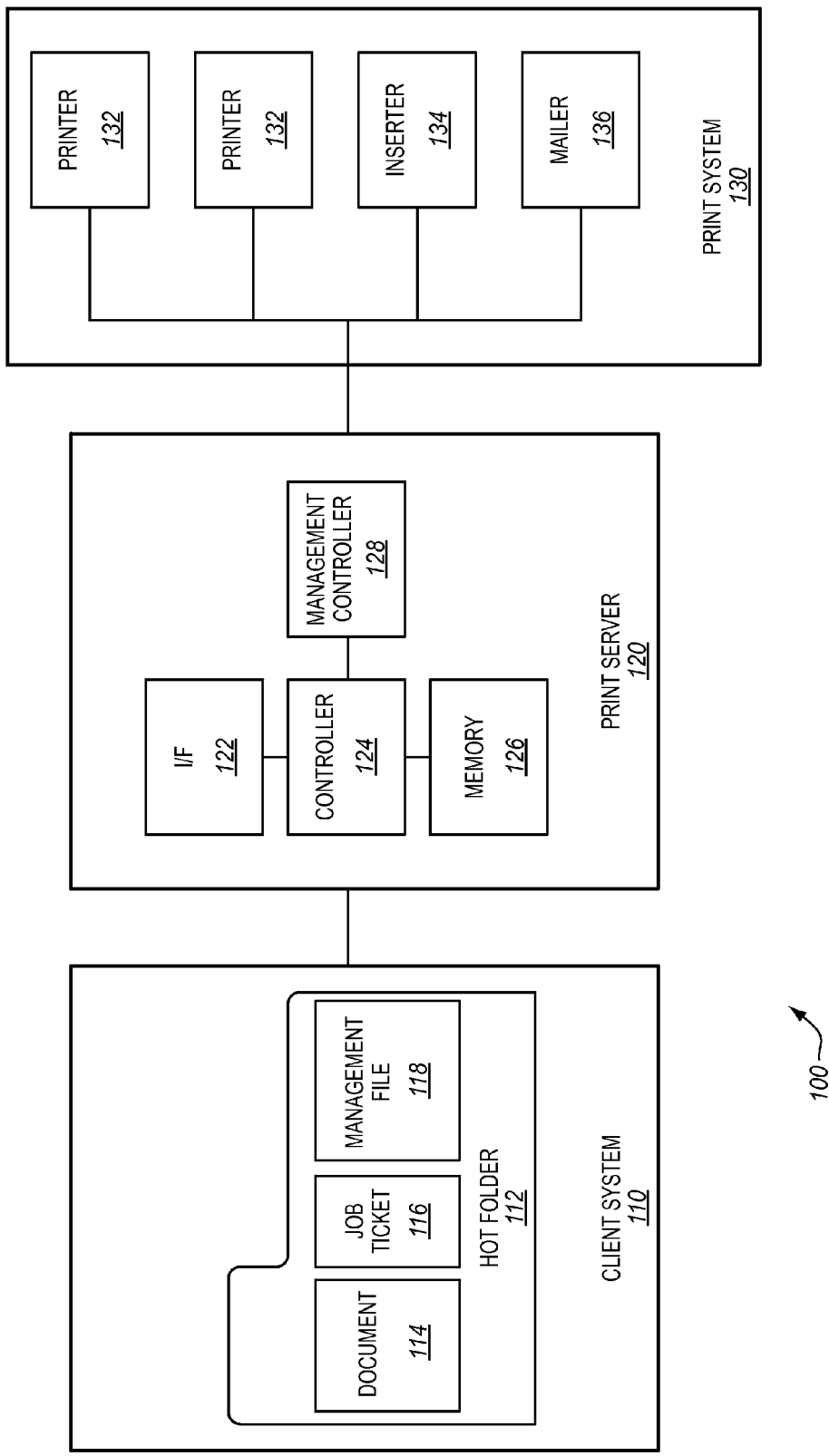
FIG. 1 illustrates a print shop architecture with hot folder implementation in an exemplary embodiment.

FIG. 1 illustrates a print shop architecture 100 with hot folder implementation in an exemplary embodiment. In this embodiment, the print shop architecture 100 includes a client system 110, a print server 120, and a print system 130. The client system 110 stores files, such as documents 114, and the print server 120 retrieves or receives the documents 114 and schedules them with the print system 130. The print system 130 includes printer(s) 132, inserter(s) 134, and/or mailer(s) 136 and is operable to mark a medium with ink and/or perform other print-related tasks such as post-print handling of the documents 114 (e.g., inserting, sorting, mailing, etc.) in accordance with print data received from the print server 120.

The print server 120 includes an interface 122, a controller 124, and memory 126. The interface 122 is operable to communicate with devices and systems over a network, such as client system 110 and print system 130. The controller 124 manages the operations of the print server 120 (e.g., retrieves files from hot folders 112 via the interface 122, manages print jobs through a workflow, etc.). Memory 126 stores data used by print server 120 to facilitate processing of the documents 114. For example, memory 126 may store settings for the hot folder 112 that govern a location of the hot folder 112 and a regular time interval for sweeping files contained in the hot folder 112. In some embodiments, a job ticket 116 is associated with the hot folder 112 and defines general attributes for printing documents 114. The job ticket 116 may be stored in memory 126 on the print server 120.

The print server 120 is enhanced with a management controller 128 that is operable to detect a management file 118 in the hot folder 112. The management file 118 includes customized processing instructions for documents 114 associated with the hot folder 112. Without the management file 118, the controller 124 processes documents 114 placed in the hot folder 112 in accordance with the default/installed settings of the hot folder 112 stored on the print server 120 (e.g., stored in memory 126) and/or the general attributes that are defined in the job ticket 116. As will be described in more detail below, the management controller 128 integrates user-defined processing steps on a project-by-project basis in accordance with entries in the management file 118.

Figure 2:
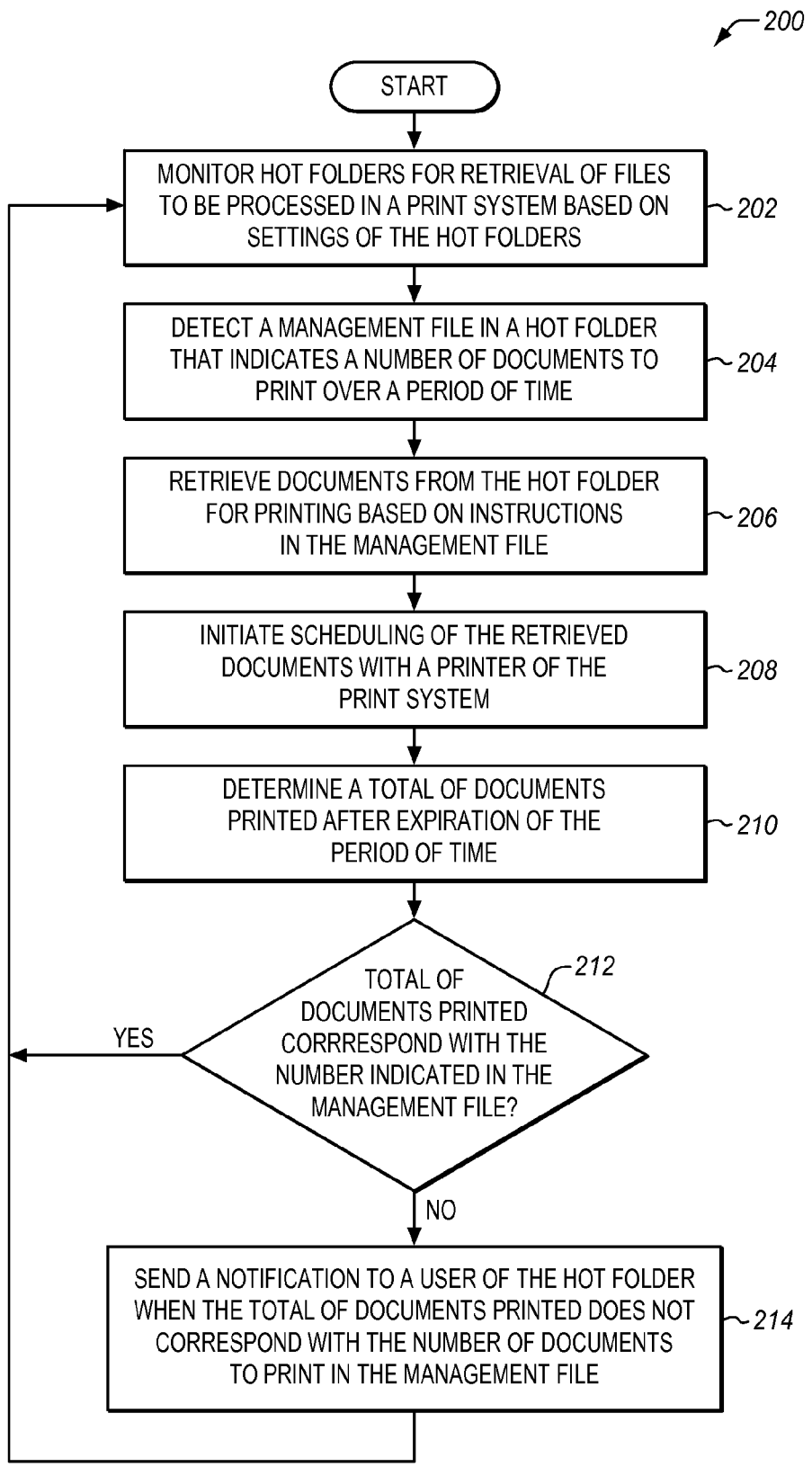
FIG. 2 is a flowchart illustrating a method for operating a print server in a print shop architecture with hot folder implementation in an exemplary embodiment.

FIG. 2 is a flowchart illustrating a method 200 for operating a print server in a print shop architecture with hot folder implementation in an exemplary embodiment. The steps of method 200 are described with reference to the print shop architecture 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, the controller 124 monitors one or more hot folders for retrieval of files to be processed in the print system 130 based on settings of each of the hot folders. The files may include documents 114 for printing, inserting, mailing, etc. In some embodiments, job tickets 116, such as Job Definition Format (JDF) job tickets, define general processing steps (preflight, finishing, etc.) for files as they are processed as print jobs. Settings of the hot folder 112 typically define a location of the hot folder 112 and a time interval for checking for files to be swept from the hot folder 112 into a workflow.

In step 204, the management controller 128 detects a management file 118 in the hot folder 112 that indicates a number of documents to print over a period of time. The management controller 128 may be configured to detect the management file 118 based on a filename and/or a file extension that identifies the management file 118 as such. Upon detection, the management controller 128 may sweep the management file 118 and parse the entries contained therein. In one embodiment, the period of time is specified in an entry of the management file 118.

In step 206, the management controller 128 retrieves documents from the hot folder 112 for printing based on instructions in the management file 118. In one embodiment, the management controller 128 retrieves the documents that are named in the management file 118. Alternatively or additionally, documents may be swept from the hot folder 112 as they are added into the hot folder 112 and/or detected by the management controller 128. Identifying certain documents in the management file 118 that are to be processed by the print system 130 may be advantageous in situations where some documents have not yet fully transferred into the hot folder 112 or when the documents are to be added to the hot folder 112 at a later time.

In some embodiments, entries in the management file 118 instruct the management controller 128 to override, at least temporarily, the default or installed settings for the hot folder 112 that is used by the controller 124. For instance, the management file 118 may specify a retrieval event (e.g., wait to sweep until presence of certain documents or until a specified number of documents are in the hot folder 112) and/or a retrieval time that differs from the regular sweeping interval in the settings of the hot folder 112. Alternatively or additionally, the management file 118 may identify documents stored at a location external to the hot folder 112 that are to be processed in the print system 130.

In step 208, the management controller 128 initiates scheduling of the retrieved documents with a printer 132 of the print system 130. In step 210, the management controller 128 determines a total of documents printed after expiration of the period of time. In step 212, the management controller 128 determines whether the total of documents printed after expiration of the period of time corresponds with the number of documents to print as indicated in the management file 118. If the total of documents printed after expiration of the period time does not correspond with the number of documents to print as indicated in the management file 118, the method 200 proceeds to step 214 and the management controller 128 sends a notification to a user of the hot folder 112 based on contact information supplied in the management file 118. Otherwise, the method 200 may simply repeat as shown in FIG. 2.

Using method 200, the print server 120 may send notification to a user when the number of files printed does not match the expected total number of files to print as indicated by the user in the management file 118. The users or software program that populate the hot folder 112 with documents typically have more knowledge than a print system operator as to the expected size of a task as well as which documents may have a high priority for being printed and mailed to the correct address in time. Therefore, the management file 118 enables the management controller 128 to inform the user of certain events that may have been unexpected so that the user may take remedial action if necessary. Moreover, the print operator is released from the repetitive task of reporting statuses for multiple clients and adjusting settings in workflow software to accommodate individual needs of many different clients.

In one embodiment, the management controller 128 is operable to send notification of various other processing events in the print system 130. For example, the management file 118 may indicate an expectation for certain documents or a certain number of documents to complete printing, inserting, mailing, etc. The management file 118 may also include contact information that is specific to one or more of the processing events such that the management controller 128 may send messages to the appropriate user regarding the processing success/failure compared with the expectation information in the management file 118. In another embodiment, the management file 118 may indicate to the management controller 128 to send an acknowledgement receipt to confirm that an indicated list of files or that an indicated number of files completed printing and/or mailing by a certain time. In yet another embodiment, the management file 118 may instruct the management controller 128 to send an error log that certain documents and/or a certain number of documents failed at one or more stages of the print system 130.

In another embodiment, the management controller 128 is operable to verify data integrity of documents 114 added to the hot folder 112 based on information in the management file 118. For example, when a print file is pulled into a workflow, the management controller 128 may perform pre-processing steps such as marking page boundaries with triggers that identify the mail piece to which a particular document belongs. The management controller 128 may compare the trigger count with an expected number of mail pieces indicated in the management file 118 and verify/warn the indicated contact of the comparison. In another example, the management controller 128 confirms or warns a user as to whether certain documents or a certain number of documents were received at the print server 120 compared with information supplied in the management file 118. In yet another example, the management controller 128 performs a checksum of one or more files/documents against an expected storage size indicated in the management file 118. Thus, the user of the hot folder 112 has added assurance that the correct documents are to be processed in the print system 130.

In another embodiment, the management file 118 indicates contact information and a preferred communication format for messages pertaining to certain documents and/or processing events. For example, the management file 118 may include email addresses and/or phone numbers associated with a processing event, such as confirmation that a group of documents named in the management file 118 were printed and mailed. The management file 118 may also indicate the type of delivery for the message, such as whether to send an automated voice message, Short Message Service (SMS) text message, and/or an email. Still further, the management file 118 may indicate the content of the message, such as a list of documents that succeeded and/or failed, or the address/time related to the mailing of a specific document or group of documents. The management controller 128 is operable to format the notification in accordance with the preferences indicated in the management file 118.

In yet another embodiment, the management controller 128 is operable to retrieve one or more documents 114 that are stored separately or externally from the hot folder 112. For example, the management file 118 may include information that identifies a storage location, such as a content server, that stores documents 114 separately from the hot folder 112. The external storage location may be identified with an Internet Protocol (IP) address or Uniform Resource Locator (URL) address and may accompany additional authentication information such as a username, password, etc. The management controller 128 retrieves the documents from the content server based on the location and authentication information supplied in the management file 118.

In another embodiment, the management file 118 may additionally indicate a specific job type for certain documents, such as printing attributes (e.g., 1 up, 2 up, duplex, needs cutter, etc.) and mailing attributes (e.g., fold vs flat envelope, postage, weight, inserter setup, etc.) for specifically identified documents. The management controller 128 may handle these documents separately from default settings that govern the print job attributes of the hot folder 112. Additionally, the management controller 128 may identify an entry in the management file 118 that toggles a test job mode for documents 114 in the hot folder 112. Other custom processing instructions may also be included in the management file 118 such as a command to insert/mail all or a specified subset of documents or instructions to unpack compressed file types.

EXAMPLE

Figure 3:
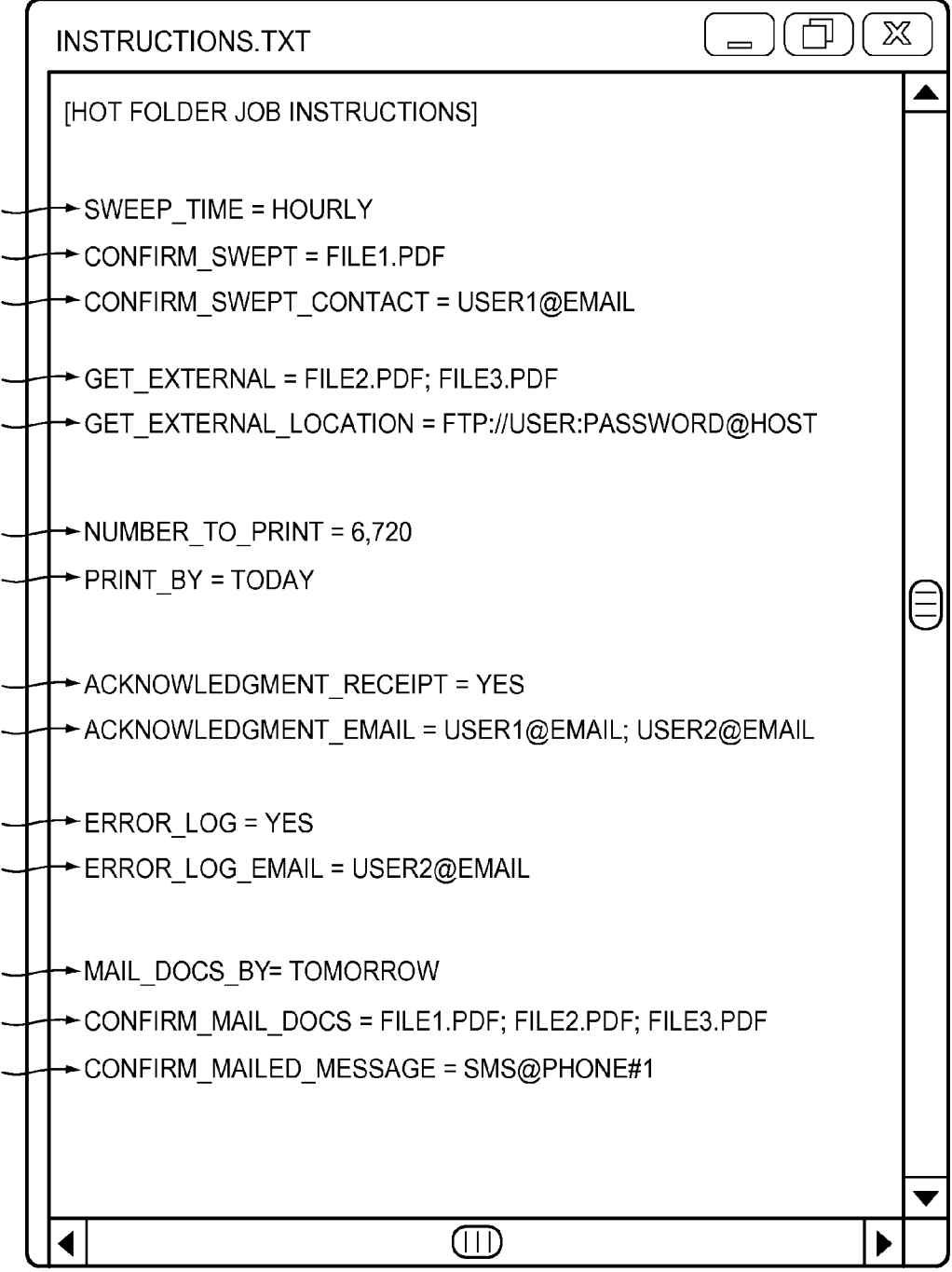
FIG. 3 illustrates a customized hot folder management file in an exemplary embodiment.

FIG. 3 illustrates a customized management file 118 for a hot folder in an exemplary embodiment. A user may name a file or create an extension (e.g., "instructions.txt") that is compatible/recognizable to the management controller 128. The user may drag-and-drop the management file 118 in the hot folder 112. Upon detection, management controller 128 retrieves the management file 118 and processes entries 301-314, shown in FIG. 3. In this example, the user has instructed the management controller 128 to sweep documents 114 from the hot folder 112 an hourly basis, as shown in entry 301. Additionally, the user has instructed the management controller 128 to confirm reception of file1.pdf to a user email address contact as shown in entries 302 and 303.

In addition to the documents that are added to the hot folder 112 and swept on an hourly basis, the management controller 128 retrieves file2.pdf and file3.pdf at a location independent from the hot folder 112, as shown in entries 304 and 305 of the management file 118. In entries 306 and 307, the user has indicated an expectation to print 6,720 documents during that day. Therefore, at the end of the day (e.g., 12 p.m.) the management controller 128 determines how many documents associated with the hot folder 112 were printed. If the total number of printed documents matches the number of expected documents to print (e.g., 6,720) the management controller 128 sends an acknowledgement receipt to user1@email and user2@email in accordance with entries 308 and 309 of the management file 118. Otherwise, if the total number of printed documents during the day does not match the expected number, the management controller 128 sends an error log to user2@email in accordance with entries 310 and 311 of the management file 118.

The management file 118 also identifies a deadline to mail the documents by the next day, in entry 312. The management controller 128 tracks the mailing of file1.pdf, file2.pdf, and file3.pdf indicated in entry 313 of the management file. The management controller 128 texts information pertaining to the mailing of the indicated documents in accordance with entry 314.

Figure 4:
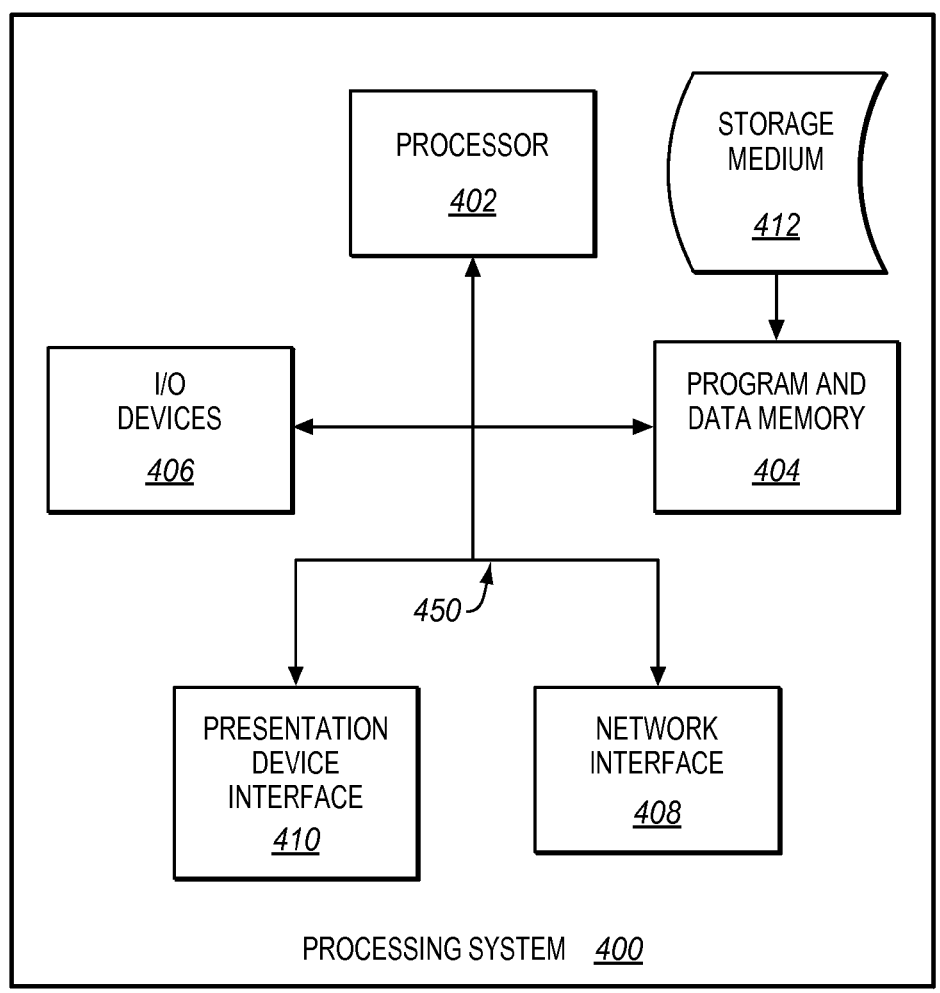
FIG. 4 illustrates a processing system configured to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print server 120 to perform the various operations disclosed herein. FIG. 4 illustrates a processing system 400 operable to execute a computer readable medium embodying programmed instructions to perform desired functions in an exemplary embodiment. Processing system 400 is operable to perform the above operations by executing programmed instructions tangibly embodied on computer readable storage medium 412. In this regard, embodiments of the invention can take the form of a computer program accessible via computer-readable medium 412 providing program code for use by a computer or any other instruction execution system. For the purposes of this description, computer readable storage medium 412 can be anything that can contain or store the program for use by the computer.

Computer readable storage medium 412 can be an electronic, magnetic, optical, electromagnetic, infrared, or semiconductor device. Examples of computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 400, being suitable for storing and/or executing the program code, includes at least one processor 402 coupled to program and data memory 404 through a system bus 450. Program and data memory 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc.) can be coupled either directly or through intervening I/O controllers. Network adapter interfaces 408 may also be integrated with the system to enable processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 410 may be integrated with the system to interface to one or more display devices, such as printing systems and screens for presentation of data generated by processor 402.

Although specific embodiments were described herein, the scope of the invention is not limited to those specific embodiments. The scope of the invention is defined by the following claims and any equivalents thereof.

I claim:

1. An apparatus comprising:
   a print server configured to monitor hot folders for retrieval of files to be processed in a print system based on settings of the hot folders;
   the print server configured to detect a management file in a hot folder that indicates a number of documents to print over a period of time, to retrieve documents from the hot folder for printing based on instructions in the management file, and to initiate scheduling of the retrieved documents with a printer of the print system, wherein the period of time is specified in a first entry of the management file, and wherein the number of documents to print is a number specified in a second entry of the management file, the specified number representing a number of documents intended to be printed before the period of time expires;
   the print server configured to determine a total of documents printed after expiration of the period of time, to determine whether the total of documents printed corresponds with the number of documents to print indicated in the management file, and to send a notification to a user of the hot folder when the total of documents printed does not correspond with the number of documents to print indicated in the management file.

2. The apparatus of claim 1 wherein:
   the print server is configured to override settings stored on the print server for the hot folder when the instructions in the management file conflict with the settings of the hot folder.

3. The apparatus of claim 1 wherein:
   the print server is configured to process the management file to identify a content server that stores documents separately from the hot folder, to obtain a document from the content server with authentication information included in the management file, and to include the document in the scheduling of the retrieved documents.

4. The apparatus of claim 1 wherein:
   the management file includes an email address for an acknowledgement receipt; and
   the print server is configured to include information of the retrieved documents in the acknowledgement receipt based on processing completion of the retrieved documents, and to send the acknowledgement receipt to the email address.

5. The apparatus of claim 1 wherein:
   the management file includes an email address for an error log; and
   the print server is configured to identify documents that failed to process by the period of time, to include the identified documents in the error log, and to send the error log to the email address.

6. The apparatus of claim 1 wherein:
   the print server is configured to process documents in the hot folder as a test job based on an instruction in the management file.

7. A method performed by a print server, the method comprising:
   monitoring hot folders for retrieval of files to be processed in a print system based on settings of the hot folders;
   detecting a management file in a hot folder that indicates a number of documents to print over a period of time, wherein the period of time is specified in a first entry of the management file, and wherein the number of documents to print is a number specified in a second entry of the management file, the specified number representing a number of documents intended to be printed before the period of time expires;
   retrieving documents from the hot folder for processing based on instructions in the management file;
   initiating scheduling of the retrieved documents with a printer of the print system;
   determining a total of documents printed after expiration of the period of time;
   determining whether the total of documents printed corresponds with the number of documents to print indicated in the management file; and
   sending a notification to a user of the hot folder when the total of documents printed does not correspond with the number of documents to print indicated in the management file.

8. The method of claim 7 further comprising:
   overriding stored settings for the hot folder when the instructions in the management file conflict with the settings of the hot folder.

9. The method of claim 7 further comprising:
   processing the management file to identify a content server that stores documents separately from the hot folder;
   obtaining a document from the content server with authentication information included in the management file; and
   including the document in the scheduling of the retrieved documents.

10. The method of claim 7 wherein:
    the management file includes an email address for an acknowledgement receipt; and the method further comprises including information of the retrieved documents in the acknowledgement receipt based on processing completion of the retrieved documents, and sending the acknowledgment receipt to the email address.

11. The method of claim 7 wherein:
the management file includes an email address for an error log; and
the method further comprises:
identifying documents that failed to process by the period of time;
including the identified documents in the error log; and
sending the error log to the email address.

12. The method of claim 7 further comprising:
processing documents in the hot folder as a test job based on an instruction in the management file.

13. A non-transitory computer readable medium embodying programmed instructions which, when executed by a processor, are operable for performing, by a print server, a method, the method comprising:
monitoring hot folders for retrieval of files to be processed in a print system based on settings of the hot folders;
detecting a management file in a hot folder that indicates a number of documents to print over a period of time, wherein the period of time is specified in a first entry of the management file, and wherein the number of documents to print is a number specified in a second entry of the management file, the specified number representing a number of documents intended to be printed before the period of time expires;
retrieving documents from the hot folder for processing based on instructions in the management file;
initiating scheduling of the retrieved documents with a printer of the print system;
determining a total of documents printed after expiration of the period of time;
determining whether the total of documents printed corresponds with the number of documents to print indicated in the management file; and
sending a notification to a user of the hot folder when the total of documents printed does not correspond with the number of documents to print indicated in the management file.

14. The medium of claim 13 wherein the method further comprises:
overriding settings stored on the print server for the hot folder when the instructions in the management file conflict with the settings of the hot folder.

15. The medium of claim 13 wherein the method further comprises:
processing the management file to identify a content server that stores documents separately from the hot folder;
obtaining a document from the content server with authentication information included in the management file; and
including the document in the scheduling of the retrieved documents.

16. The medium of claim 13 wherein:
the management file includes an email address for an acknowledgement receipt; and
the method further comprises including information of the retrieved documents in the acknowledgement receipt based on processing completion of the retrieved documents, and sending the acknowledgment receipt to the email address.

17. The medium of claim 13 wherein:
the management file includes an email address for an error log; and
the method further comprises:
identifying documents that failed to process by the period of time;
including the identified documents in the error log; and
sending the error log to the email address.

18. The medium of claim 13 wherein the method further comprises:
processing documents in the hot folder as a test job based on an instruction in the management file.

* * * * *